United States Patent
Pfau et al.

(10) Patent No.: US 8,903,238 B2
(45) Date of Patent: Dec. 2, 2014

(54) ULTRA DENSE WDM WITH AGILE AND FLEXIBLE DSP ADD-DROP

(75) Inventors: Timo J. Pfau, Westfield, NJ (US); Noriaki Kaneda, Westfield, NJ (US); Young-Kai Chen, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 129 days.

(21) Appl. No.: 13/608,531

(22) Filed: Sep. 10, 2012

(65) Prior Publication Data
US 2014/0072303 A1    Mar. 13, 2014

(51) Int. Cl.
*H04J 14/06* (2006.01)
*H04J 4/00* (2006.01)
*H04B 10/00* (2013.01)
*H04B 10/12* (2006.01)

(52) U.S. Cl.
USPC ............... 398/65; 398/76; 398/152; 398/183; 398/193

(58) Field of Classification Search
CPC ............. H04B 10/5053; H04B 10/505; H04B 10/5055; H04B 10/532; H04B 10/614; H04J 14/06
USPC .............. 398/65, 76, 152, 183, 184, 192, 193
See application file for complete search history.

(56) References Cited

U.S. PATENT DOCUMENTS

| | | | | |
|---|---|---|---|---|
| 7,596,323 | B1* | 9/2009 | Price et al. | 398/141 |
| 8,594,515 | B2* | 11/2013 | Liu et al. | 398/208 |
| 2012/0039606 | A1* | 2/2012 | Grigoryan et al. | 398/65 |
| 2013/0028603 | A1* | 1/2013 | Chien et al. | 398/65 |
| 2013/0195459 | A1* | 8/2013 | Shieh | 398/79 |
| 2013/0216232 | A1* | 8/2013 | Zanoni et al. | 398/79 |

OTHER PUBLICATIONS

Li, Mo, et al., "Optical Burst-Mode Coherent Receiver With a Fast Tunable Lo for Receiving Multi-Wavelength Burst Signals", OFC/NFOEC Technical Digest 2012, 3 pages.

* cited by examiner

*Primary Examiner* — Dalzid Singh
(74) *Attorney, Agent, or Firm* — Hitt Gaines, PC

(57) ABSTRACT

A system, e.g. for optical communication, includes an I-Q modulator and a transmission signal processor. The I-Q modulator is configured to modulate a first light source in response to first I and Q modulation signals. The transmission signal processor is configured to receive a data stream including data corresponding to a first data subchannel. The processor maps the data subchannel to an optical transmission subchannel and outputs the first I and Q modulation signals. The I and Q modulation signals modulate the light source to produce an optical transmission signal that includes wavelength components corresponding to the optical transmission subchannel.

21 Claims, 7 Drawing Sheets

ULTRA DENSE WDM WITH AGILE AND FLEXIBLE DSP ADD-DROP

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Conventional dense wavelength-division multiplexing (DWDM) systems typically have a grid spacing of about 50 GHz. While this spacing has been sufficient for many purposes, increasing demand for more customers/channel, greater reach and greater capacity are expected to exceed conventional grid capacity.

SUMMARY

One aspect provides a system, e.g. for optical communication. The system includes an I-Q modulator and a transmission signal processor. The I-Q modulator is configured to modulate a first light source in response to first I and Q modulation signals. The transmission signal processor is configured to receive a data stream including data corresponding to a first data subchannel. The processor maps the data subchannel to an optical transmission subchannel and outputs the first I and Q modulation signals. The I and Q modulation signals modulate the light source to produce an optical transmission signal that includes wavelength components corresponding to the optical transmission subchannel.

Another method provides a method, e.g. for forming an optical communication system. The method includes configuring an I-Q modulator to modulate a first light source in response to first I and Q modulation signals. The method further includes configuring a transmission signal processor to receive a data stream including data corresponding to a first data subchannel. The processor maps the data subchannel to an optical transmission subchannel and outputs the first I and Q modulation signals. The I and Q modulation signals modulate the light source to produce an optical transmission signal that includes wavelength components corresponding to the optical transmission subchannel.

In some of the above described embodiments the I-Q modulator is a first I-Q modulator, and the system includes a second I-Q modulator and a polarization multiplexer. The second I-Q modulator is configured to modulate a second light source in response to second I and Q modulation signals. The polarization multiplexer is configured to receive outputs of the first and second I-Q modulators and output the optical transmission signal with first and second polarization modes. Furthermore in such embodiments the transmission signal processor is further configured to 1) map a second data subchannel of the data stream to a second optical transmission subchannel, and 2) output the second I and Q modulation signals to modulate the second light source to produce wavelength components of the optical transmission signal that correspond to the second optical transmission subchannel.

Some embodiments of the system include an optical receiver configured to recover data corresponding to the first data subchannel from the optical transmission subchannel. In some such embodiments the optical receiver may be configured to recover data from fewer than all optical transmission subchannels present on the optical transmission signal.

In some embodiments the transmission signal processor is selectively configurable to implement different modulation protocols for the first and second transmission subchannels. In some embodiments a single laser provides both of the first and second light sources. In some embodiments the first data subchannel is mapped to a horizontal polarization of the optical transmission signal, and the second data subchannel is mapped to a vertical polarization of the optical transmission signal. In some embodiments the system includes an optical receiver including an optical hybrid configured to recover I and Q signals for each of the first and second polarization modes. In some embodiments the system further includes a first optical receiver configured to recover the first data subchannel from the optical transmission signal, and a second optical receiver configured to recover the second data subchannel from the optical transmission signal.

BRIEF DESCRIPTION

Reference is now made to the following descriptions taken in conjunction with the accompanying drawings, in which.

Figure 1:
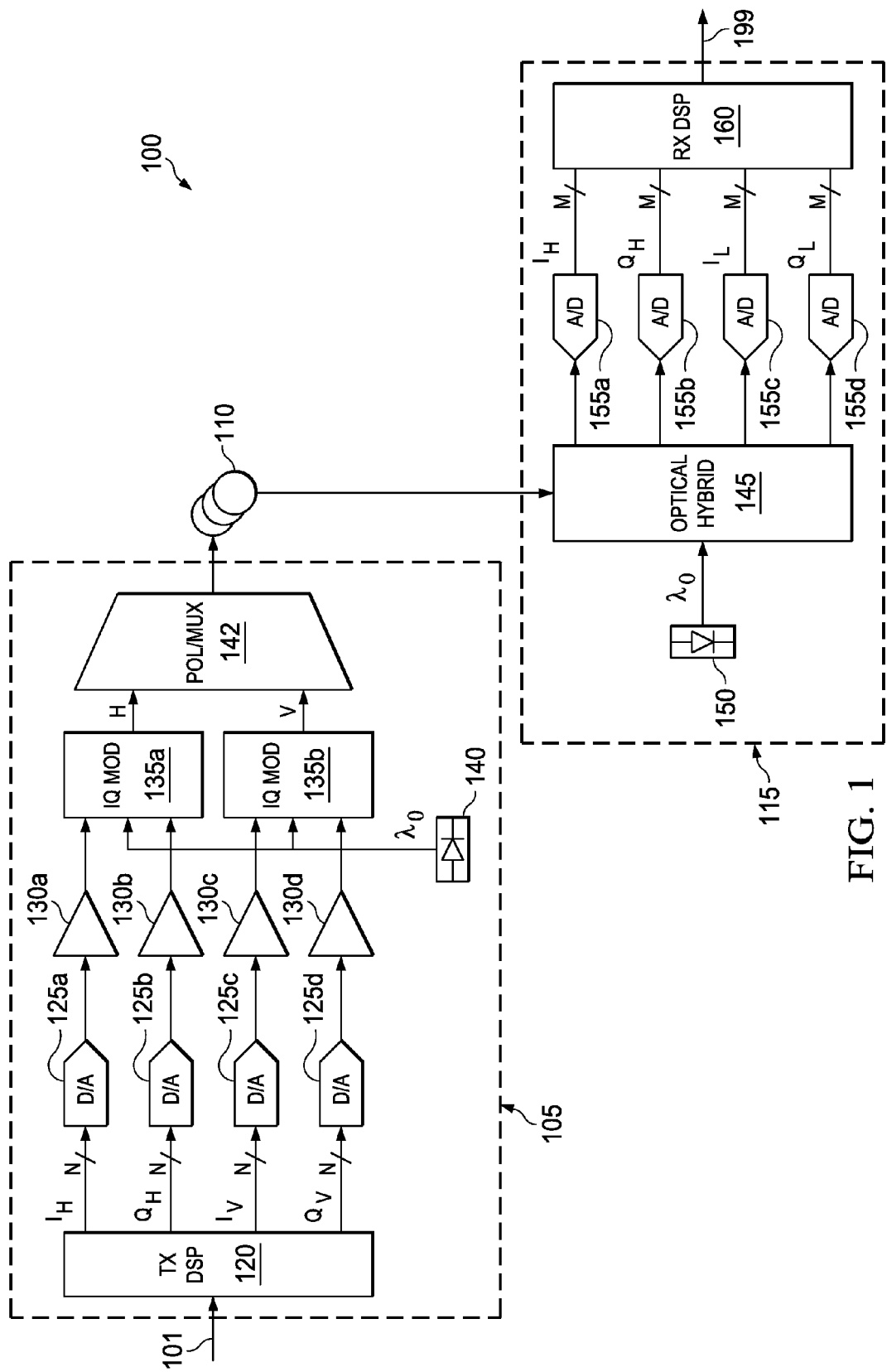
FIG. 1 illustrates a system according to one embodiment of the disclosure, e.g. for transmitting and receiving an optical signal with one or more data subchannels within a WDM grid space, including transmit and receive signal processors.
Figure 4:
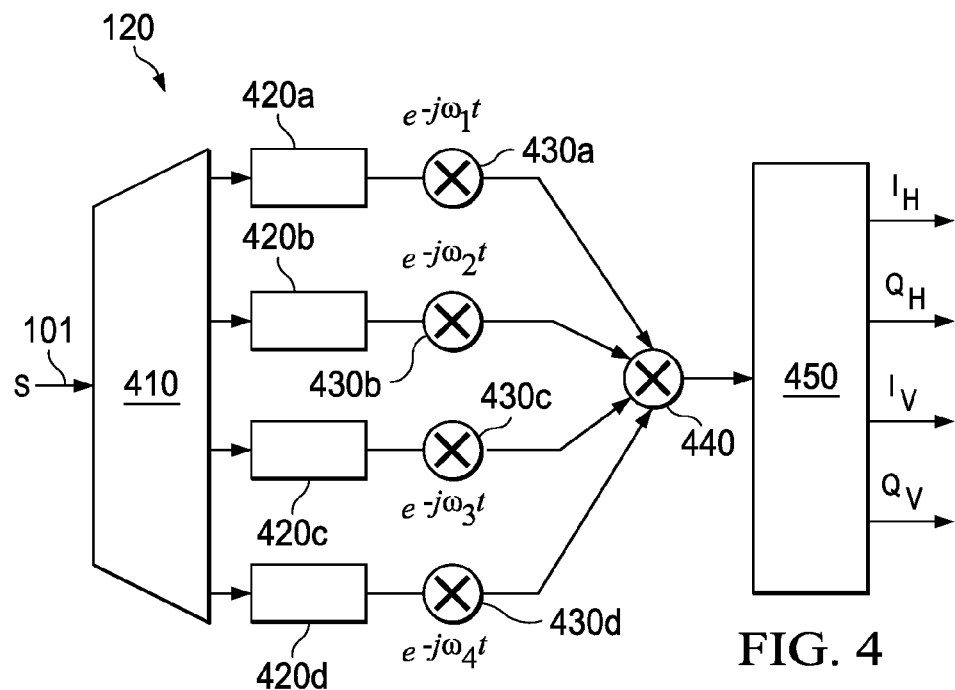
Figure 5:
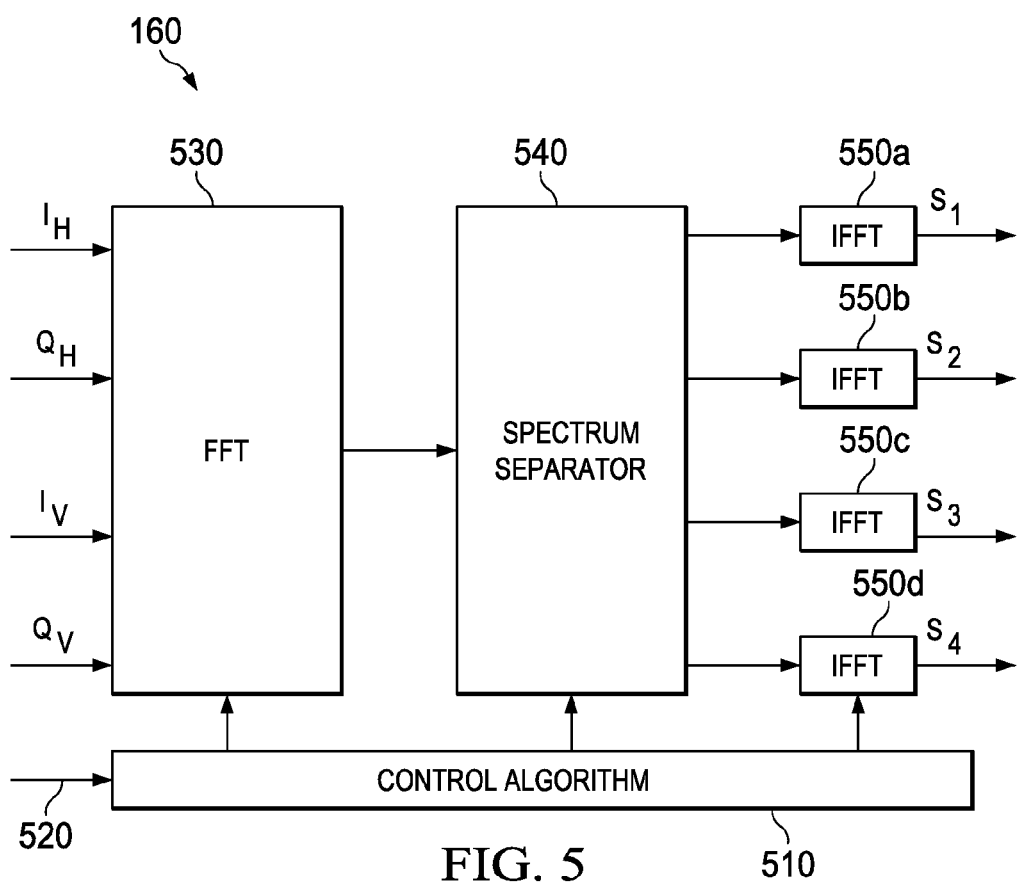
Figure 6:
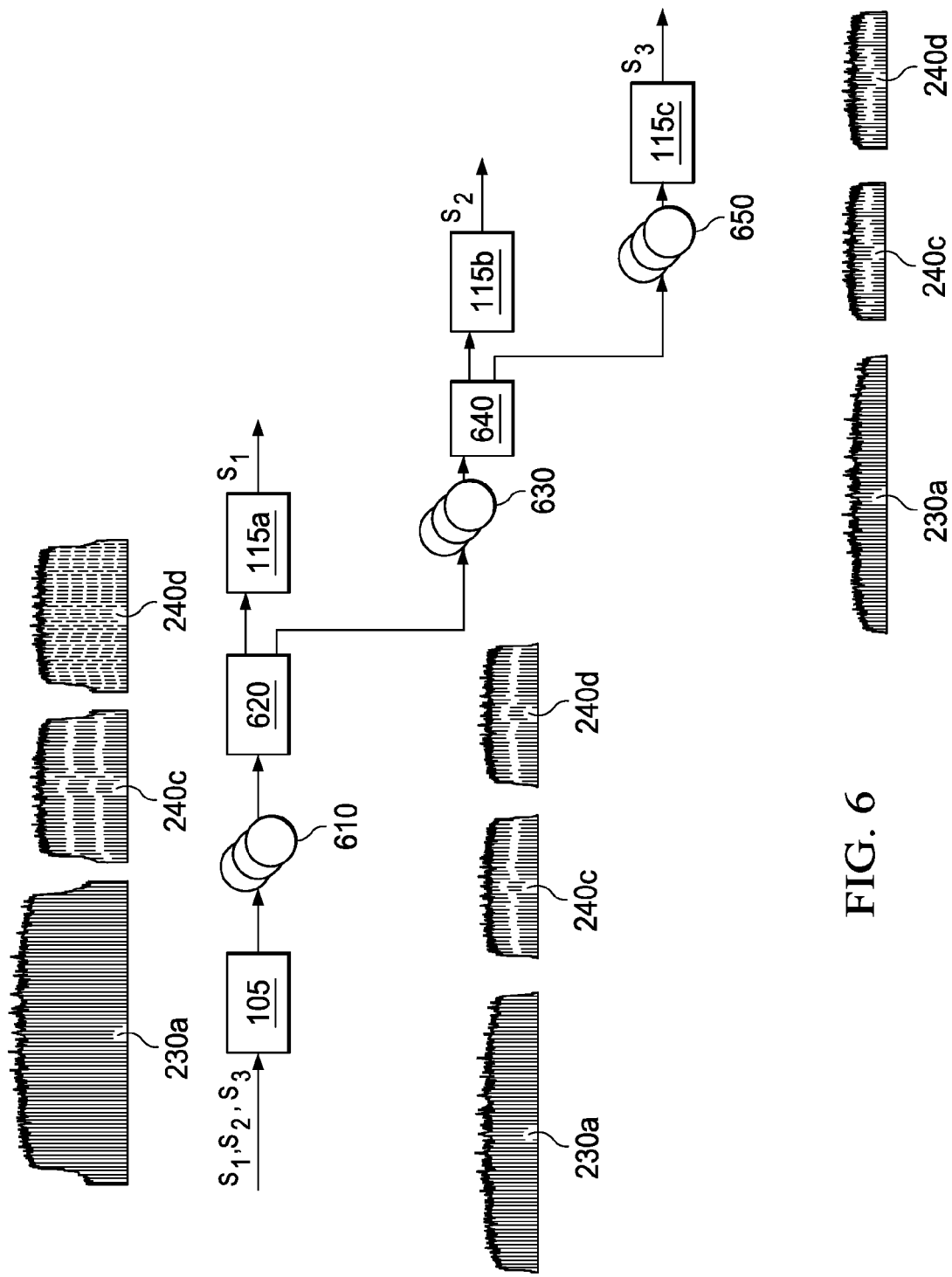
Figure 7A:
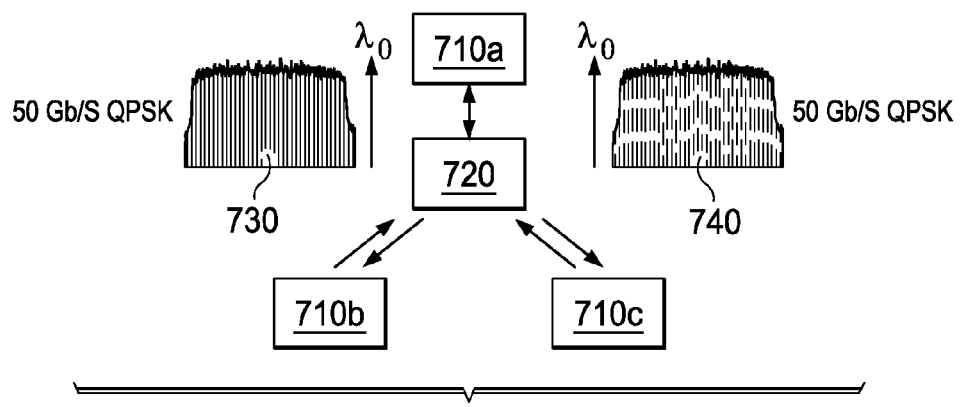
Figure 7B:
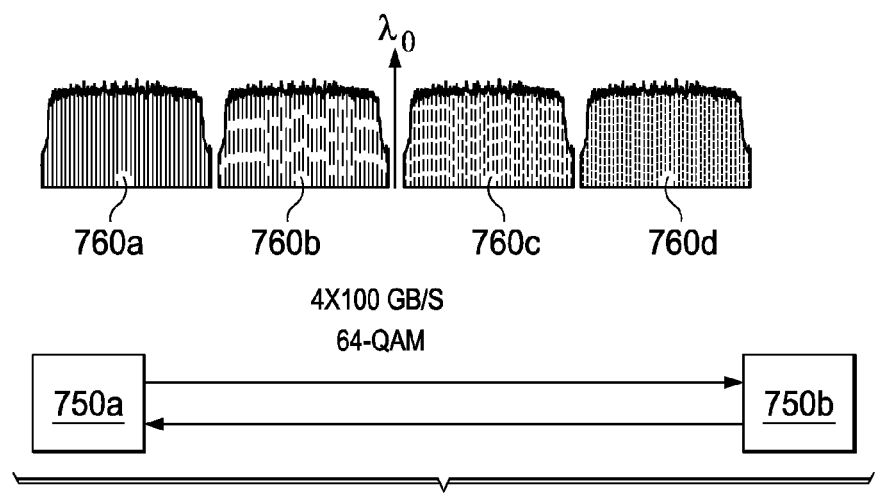

FIG. 4 schematically illustrates one example embodiment of functional blocks of the transmit signal processor of FIG. 1;

FIG. 5 schematically illustrates one example embodiment of functional blocks of the receive signal processor of FIG. 1;

FIG. 6 illustrates one embodiment of an optical communication system that transmits a plurality of subchannels in a WDM grid space using one transmitter subsystem and multiple instances of the receiver subsystem illustrated in FIG. 1;

FIGS. 7A-7B illustrate example embodiments of transceivers; and

Figure 8:
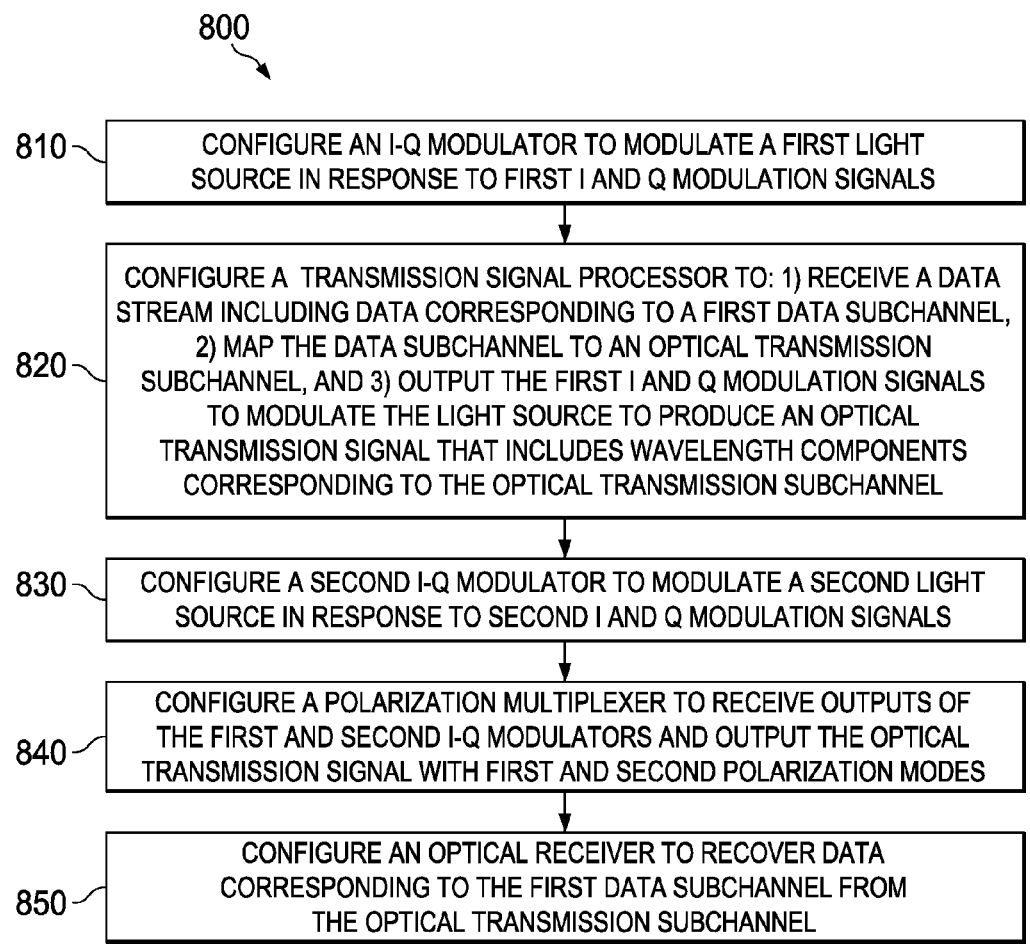

FIG. 8 presents a method, e.g. for forming the optical communication system of FIG. 1.

DETAILED DESCRIPTION

There is strong commercial demand for the ability to flexibly add channels and/or capacity to optical communications paths, e.g. using wavelength division multiplexed (WDM) transmission. In some cases it is desirable that such solutions provide ultra dense spectrum multiplexing, (e.g. less than conventional DWDM grid of 50 GHz to provide greater granularity to the network transmission capacity, yet maintain a very high bit rate, e.g. 100 Gb/s per channel. One possible solution to such a need is the use of an optical comb generator together with an interleaver, optical coupler and multiple optical modulators. Such a solution, however, requires complex hardware and multiple optical components, and would therefore be prohibitively expensive in many applications.

The inventors have determined an innovative and flexible solution to the above-described need. Various embodiments presented herein provide very high-speed data converters, e.g. digital signal processors (DSPs), digital to analog converters (DACs), and analog to digital converters (ADCs) to process multiple channels in parallel to produce a synthetic optical transmission spectrum having one or more transmission subchannels. System architecture provides channel scalability without a prohibitive increase in optical component costs. Such embodiments allow agile and flexible add-drop optical WDM networks that can be reconfigured quickly, e.g. in a matter of milliseconds, using digital signal processing at the terminals. Expensive optical components, such as a reconfigurable optical add-drop multiplexer (ROADM) or wavelength selective switches, are not needed. Thus in addition to flexibility, embodiments of the invention may provide a highly economical solution as well.

FIG. 1 illustrates without limitation one illustrative embodiment of a system 100, e.g. an optical communications system. The system 100 receives an electrical domain digital data stream 101 including data logically associated with one or more data subchannels. For the purposes of this discussion a single data channel is regarded as having one data subchannel. A transmitter subsystem 105 operates to convert the data stream 101 to a synthetic spectrum for transmission over a fiber span 110. An optical receiver subsystem 115 operates to demodulate the synthetic spectrum and recover the one or more data subchannels.

The transmitter subsystem 105 includes a transmit DSP 120. The DSP 120 provides four N-bit wide digital outputs, $I_H$, $Q_H$, $I_V$ and $Q_V$, to corresponding DACs 125a, 125b, 125c, and 125d. Each of drivers 130a-130d buffer the outputs of a corresponding one of the DACs 125a-d to drive I and Q inputs of I-Q modulators 135a and 135b. A light source 140, e.g. a laser, provides a common optical source to both the I-Q modulators 135. In some cases it may be preferable that the I-Q modulators 135 receiving light from the same optical source, as shown, but this is not required. In some embodiments the light source 140 produces laser light with a center wavelength of about 1550 nm, but embodiments are not limited thereto.

A polarization multiplexer (MUX) 142 receives light from the I-Q modulator 135a with a first polarization, and light from the I-Q modulator 135b with a second different polarization. These polarizations are respectively illustrated without limitation as H and V polarizations. One or both of the optical paths between the I-Q modulators 135 and the MUX 142 may include a polarization rotator (not shown) or otherwise be configured to produce the desired relative polarization at the inputs to the MUX 142. The polarization MUX 142 combines the polarized optical signals to a single optical transmission signal coupled to the fiber span 110 for transmission to the receiver subsystem 115. In some embodiments, not shown, the DSP 120 only provides one I-Q pair to a corresponding pair or DACs 125 and one I-Q modulator 135. In such embodiments the polarization MUX 142 may be omitted, and thus only a singly polarized signal is transmitted via the fiber span 110.

The receiver subsystem 115 includes an optical hybrid 145 and a local oscillator (LO) source 150 with wavelength 4. In various embodiments the LO source 150 may be a fixed- or tunable frequency optical source. Herein, fixed-frequency means the frequency of the light produced by the LO source 150 varies by less than about 3 GHz. The optical hybrid 145 recovers I and Q channels in each of the polarization orientations, e.g. H and V, and transmits these to balanced detectors (not shown) for conversion to the electrical domain. See, e.g. U.S. Pat. No. 7,809,284, incorporated herein by reference for additional information on suitable configurations of the optical hybrid 145. ADCs 155a-155d convert the outputs of the balanced detectors to the digital domain, e.g. four M-bit wide digital outputs. In some embodiments M=N, but this is not required. A receiver DSP 160 operates on the converted I and Q data and recovers one or more of the data subchannels of the input data stream 101 as an output data stream 199.

The DSPs 120 and 160, the DACs 125 and the ADCs 155 are not limited to any particular design. However, they should be capable of operating at a sufficient speed to process the highest anticipated data rate $R_{max}$ expected in the data stream 101. In a nonlimiting example, when $R_{max}$ is 100 Gb/s or 100 GS/s, it is expected that the DSPs 120 and 160 operating with a clock speed of at least about 0.5 GHz will have sufficient computational power to perform as described herein. The DACs 125 and the ADCs 155 similarly may be of any suitable design, but should be capable of performing at the anticipated modulation rate of the I and Q data signals produced by the DSP 120. In a nonlimiting example, when $R_{max}$ is 100 Gb/s the I and Q modulation symbol rate is expected to be about 25 GBaud. Thus in this example the DACs 125 and the ADCs 155 should be capable of converting samples at a rate of typically about 50 GSamples/s. It is expected that for at least some suitable ADCs and DACs, the maximum conversion speed is inversely related to the bit width of the digital values involved in the conversion, e.g. N and M. It is further expected that when the bit width is at least 5 bits, the system 100 may operate as described with sufficient fidelity for quadrature phase-shift keying (QPSK) modulation.

The DSP 120 is configured to synthesize a transmission spectrum of the transmission signal to transmit the data in the data stream 101 by one or more transmission subchannels in a WDM transmission grid. For example, the transmission grid may have a bandwidth of about 50 GHz. The synthesized spectrum may include more than one transmission subchannels. As discussed further below, a same or a different modulation protocol may be used to modulate data in each transmission subchannel. Moreover, the effective data transmission rate may be the same or different in each of the transmission subchannels. These aspects are described further with reference to FIGS. 2A-2C.

Figure 2A:
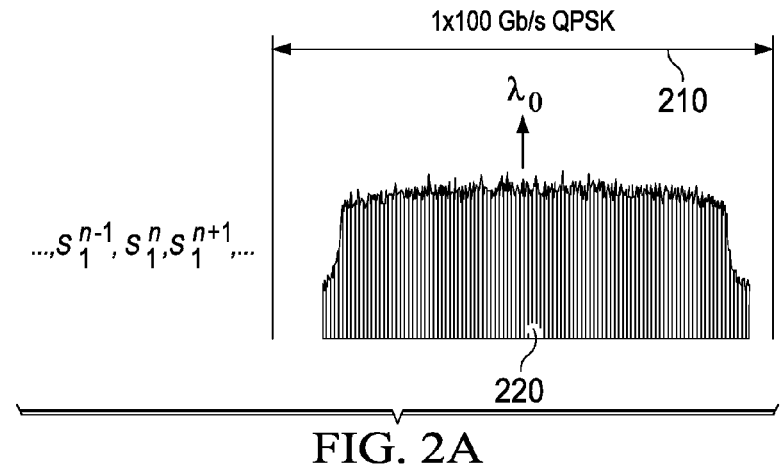
FIGS. 2A-2C illustrate examples of data subchannels and corresponding transmission subchannels.
Figure 2B:
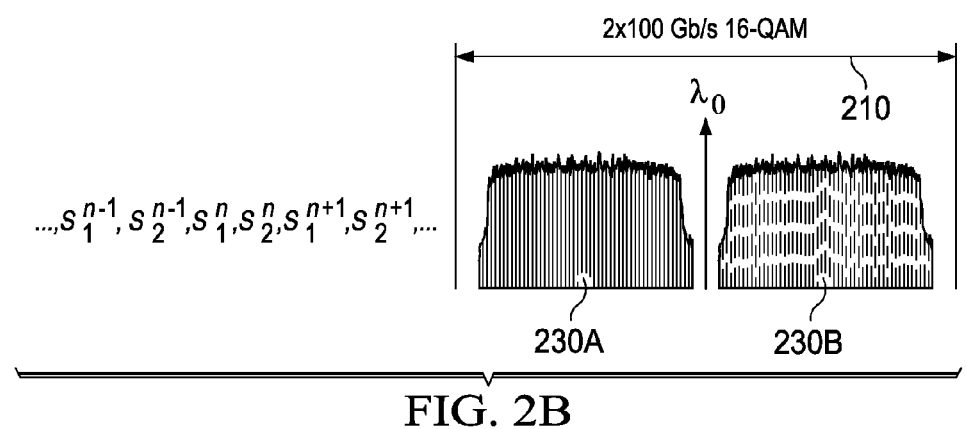
Figure 2C:
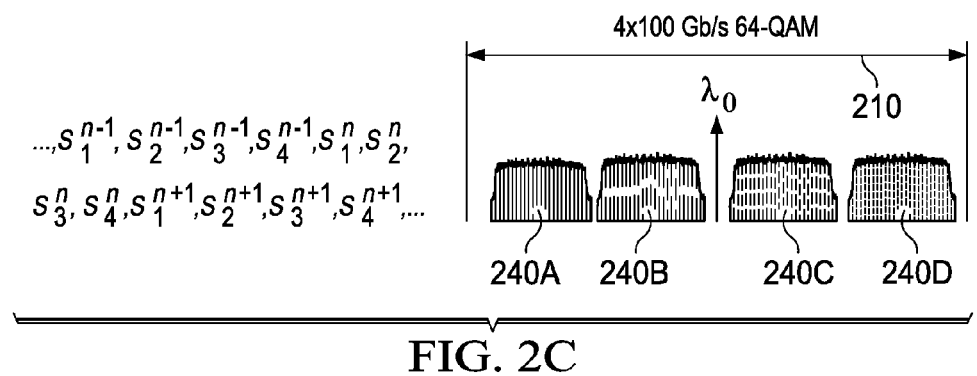

FIGS. 2A-2C illustrate spectral distributions of three different operating configurations of the system 100 within a WDM transmission grid space 210. The following description assumes without limitation a grid space of 50 GHz. FIG. 2A illustrates a QPSK modulated transmission subchannel 220 operating at 100 Gbit/s utilizing substantially all of the bandwidth available in the grid space 210. FIG. 2B illustrates two 16 quadrature amplitude modulation (16QAM) transmission subchannels 230a and 230b, each occupying about one half of the available bandwidth, or about 25 GHz each. FIG. 2C illustrates four 64QAM transmission subchannels 240a-240d, each occupying about of the available bandwidth, or about 12.5 GHz. The transmission subchannels illustrated in FIGS. 2A-2C are representative of combinations of subchannels the DSP 120 may use to transmit the data conveyed by the data stream 101 within the available 50 GHz bandwidth of the grid space 210. In various embodiments described further below, the transmission subchannels are independently configurable, meaning they may each be formatted using a different modulation protocol. Because the DSP 120 controls the operation of the I-Q modulators 135 to produce the desired spectrum, the DSP 120 may be configured as desired to produce different combinations of subchannel modulation protocols. Configuration of the DSP 120 may be by, e.g. firmware configuration, local switches, or control signals provided by a system controller.

Figure 3A:
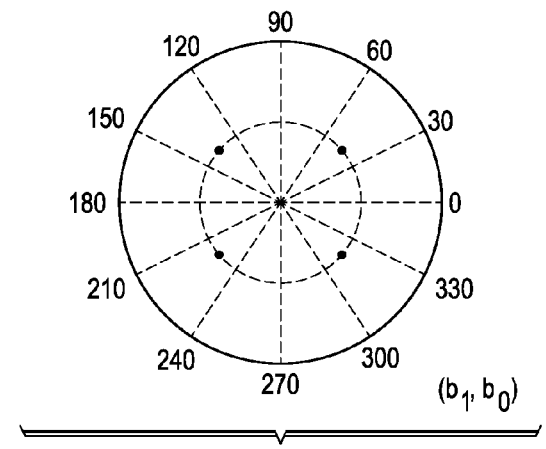
FIGS. 3A-3C illustrate example transmission protocol constellations.
Figure 3B:
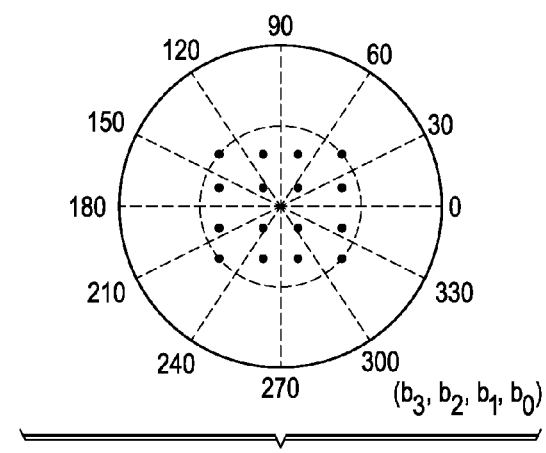
Figure 3C:
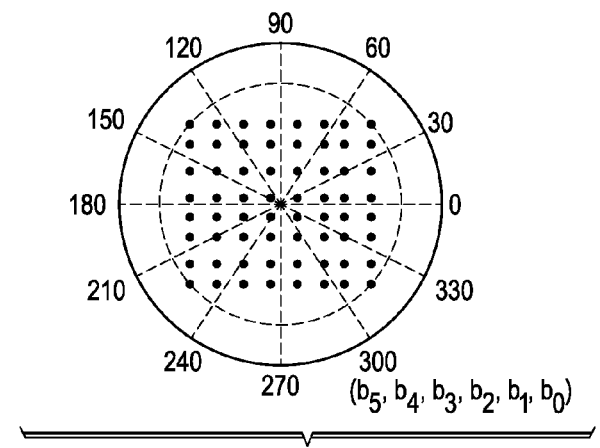

The following description concurrently refers to FIGS. 2A-2C and FIGS. 3A-3C. FIGS. 3A-3C illustrate symbol constellations for three different modulation protocols, QPSK, 16QAM and 64QAM.

Referring to FIG. 2A, the data stream 101 may provide a sequence of bits in a data subchannel $S_1$, e.g. ..., $S_1^{n-1}$, $S_1^n$, $S_1^{n+1}$, .... The bit rate may be, e.g. 100 Gb/s. In a nonlimiting embodiment the data stream 101 is to be formatted by the DSP 120 as a QPSK transmission subchannel. Referring to FIG. 3A, the QPSK constellation includes four points at (I, Q)=($\pm\sqrt{2}/2$, $\pm\sqrt{2}/2$). Thus this protocol transmits two bits per symbol. The bandwidth of the grid space 210 is about 50 GHz, so a single QPSK channel may transmit only about 50 Gb/S. The DSP 120 operates to produce one 50 Gb/s channel at a first polarization, e.g. horizontal (H) and a second 50 Gb/s channel at a second polarization, e.g. vertical (V).

FIG. 2B illustrates an example in which the DSP 120 formats the transmitted data as two polarization multiplexed transmission subchannels 230a and 230b. The transmission subchannels 230a and 230b each occupy about ½ the bandwidth of the grid space 210, or about 25 GHz in the present example. The data stream 101 may include two time-multiplexed 100 Gb/s data subchannels. For example, two subchannel data streams $S_1$ and $S_2$ may be interleaved such that the data stream 101 sequentially provides one bit from each of two interleaved streams $S_1$ and $S_2$. e.g. $S_{1(n-1)}$, $S_{2(n-1)}$, $S_{1(n)}$, $S_{2(n)}$, $S_{1(n+1)}$, $S_{2(n+1)}$ .... In some cases, the number of bits per symbol in the transmission channels may not be equal. In such cases the subchannel data in the data stream 101 may be interleaved such that the data corresponding to the transmitted symbols remains aligned between the data subchannels in the data stream 101. In this example, stream $S_1$ may be mapped to a transmission subchannel 230a, and stream $S_2$ may be mapped to a transmission subchannel 230b. In this case the DSP 120 maps the data in the $S_1$ data subchannel to the transmission subchannel 230a, and maps the data in the $S_2$ data subchannel to the transmission subchannel 230b. The transmission subchannels 230a and 230b may each be formatted using, e.g. the 16QAM protocol. As illustrated by FIG. 3B, the 16QAM protocol codes four bits of information in each transmission symbol. The transmission subchannel 230a may be modulated with a symbol rate of 12.5 GS/s (giga-symbols per second) at each of H and V polarizations to yield an equivalent data rate of 50 Gb/s at each polarization, for a total of 100 Gb/s. Similarly, 100 Gb/s may be transmitted via the transmission subchannel 230b. Thus, 200 Gb/s may be transmitted in the grid space 210.

FIG. 2C illustrates a third example, without limitation thereto, in which the data stream 101 includes four time-multiplexed 100 Gb/s binary data streams. For example, four such data streams may be interleaved such that the data stream 101 sequentially provides one bit from each of four interleaved data streams $S_1$, $S_2$, $S_3$ and $S_4$, e.g. ... $S_{1(n-1)}$, $S_{2(n-1)}$, $S_{3(n+1)}$, $S_{4(n+1)}$ .... $S_{1(n)}$, $S_{2(n)}$, $S_{3(n)}$, $S_{4(n)}$, $S_{1(n+1)}$, $S_{2(n+1)}$, $S_{3(n+1)}$, $S_{4(n+1)}$ .... In this example, the data stream $S_1$ may be mapped to a transmission subchannel 240a, the data stream $S_2$ may be mapped to a transmission subchannel 240b, the data stream $S_3$ may be mapped to a transmission subchannel 240c, and the data stream $S_4$ may be mapped to a transmission subchannel 240d.

The transmission subchannels 240a-240d may be formatted using, e.g. the 64QAM protocol. As illustrated by FIG. 3C, the 64QAM protocol codes six bits of information in each transmission symbol. The transmission subchannel 240a may be modulated with a symbol rate of 8.3 GBaud at each of H and V polarizations to yield an equivalent data rate of 50 Gb/s at each polarization, for a total of 100 Gb/s. Similarly, 100 Gb/s may be transmitted via each of the transmission subchannels 240b, 240c and 240d. Thus, 400 Gb/s may be transmitted in the grid space 210.

The examples above are merely illustrative and do not limit embodiments of the invention to any particular combination of modulation protocols used for the selected number of transmission subchannels. For instance, each subchannel may have use a different modulation protocol and/or bandwidth.

Table I displays various examples of transmission modulation configurations in several nonlimiting embodiments. The following examples continue to assume for discussion purposes that the grid space 210 is 50 GHz. In one example, the entire grid spacing may be utilized by a single transmission subchannel modulated by polarization switched (PS)-QPSK or polarization-division multiplexed (PDM)-QPSK for an effective data transfer rate of 100 Gb/S. In some embodiments the single transmission subchannel may be modulated by PDM-32QAM or PDM-64QAM for an effective data transfer rate of 400 Gb/s. In another example, one or two transmission subchannels, each utilizing 25 GHz of the available grid spacing, may be used to transmit the data. For example, a PDM-BPSK (binary phase-shift keying), PS-QPSK, or PDM-QPSK modulation protocol may be used to transmit data at 40 Gb/s/subchannel, or PDM-8QAM or PDM-16QAM may be used to transmit data at 100 Gb/s/subchannel. In a third example, as many as four subchannels may be used, each utilizing 12.5 GHz of the available grid spacing. For example, PDM-BPSK or PS-QPSK may be used to transmit data at 10 Gb/s/subchannel; PDM-QPSK or PDM-8QAM may be used to transmit data at 40 Gb/s/subchannel; or PDM-32QAM or PDM-64QAM may be used to transmit data at 100 Gb/s/subchannel.

TABLE I

| Channel spacing | Data rate | Modulation Protocol Options |
| --- | --- | --- |
| 50 GHz | 100 Gb/s | PS-QPSK/PDM-QPSK |
|  | 400 Gb/s | PDM-32QAM/PDM-64QAM |
| 25 GHz | 40 Gb/s | PDM-BPSK/PS-QPSK/PDM-QPSK |
|  | 100 Gb/s | PDM-8QAM/PDM-16QAM |
| 12.5 GHz | 10 Gb/s | PDM-BPSK/PS-QPSK |
|  | 40 Gb/s | PDM-QPSK/PDM-8QAM |
|  | 100 Gb/s | PDM-32QAM/PDM-64QAM |

The available transmission subchannel modulation protocols may be used in any combination that does not exceed the available bandwidth of the grid space 210. Thus, for example, a first transmission subchannel may be modulated using PDM-BPSK at 40 Gb/s (25 GHz), a second transmission subchannel may be modulated using PS-QPSK at 10 Gb/s (12.5 GHz) and a third transmission subchannel may be modulated using PDM-64QAM at 100 Gb/s (12.5 GHz) for a total of 50 GHz bandwidth utilization and an effective data transmission rate of 150 Gb/s.

The selection of subchannel modulation protocol may be made based on system performance considerations. For example, PDM-BPSK may transmit at a lower effective bit rate, but have greater noise immunity for long-range transmission. On the hand, PDM-64QAM may transmit at an effective bit rate of 100 Gb/s or even 400 Gb/s over relatively short fiber spans. Accordingly in some embodiments in which the DSP 120 encodes multiple transmission subchannels, the transmission subchannels may be demodulated by receivers, e.g. instances of the receiver subsystem 115, located at different distances from the transmitter subsystem 105. This aspect is described further below with respect to FIG. 6.

The aspects of multiple independent encoding of multiple transmission subchannels having been described, the computational operation of the DSPs 120 and 160 will now be described with reference to FIGS. 4 and 5. The illustrated embodiments include a number of computational modules. Those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computational processes and, optionally, on multiple signal processors. Moreover, alternative embodiments may combine multiple instances of a particular module or sub-module. Furthermore, those skilled in the art will recognize that the functions described in example embodiment are for illustration only. Operations may be combined or the functionality of the functions may be distributed in additional functions in accordance with the invention. One skilled in the computational arts may determine specific instructions to operate the DSPs 120 and 160 consistent with the described embodiments and other embodiments within the scope of the disclosure.

FIG. 4 illustrates a computational configuration of the DSP 120 in a nonlimiting illustration of one embodiment. A data demultiplexer 410 separates the incoming data stream 101 into the constituent subchannels, e.g. four subchannels. Each subchannel is processed by one of constellation mappers 420a-420d. Mixers 430a-430d respectively modulate local oscillators at $\omega_1$, $\omega_2$, $\omega_3$, and $\omega_4$ with the subchannel data. The modulated signals are combined at 440. An I/Q mapper 450 then generates digital control data streams $I_H$, $Q_H$, $I_V$ and $Q_V$ for input to D/A converters 125a-125d (FIG. 1). The transmitter subsystem 105 then operates as previously described to modulate light from the light source 140 to produce the transmission signal.

FIG. 5 illustrates a computational configuration of the DSP 160 in a nonlimiting illustration of one embodiment. A control algorithm 510 coordinates operation of the various computational modules. The operation of the control algorithm 510 is determined in part by a configuration control signal 520. As before, the configuration control signal 520 may be, e.g. a control word that corresponds to a combination of data subchannel modulation protocols received via the data stream 101. The control algorithm 510 may be configured to recover any one or more of the data subchannels conveyed by the transmission signal.

An FFT (fast Fourier transform) 530 receives the $I_H$, $Q_H$, $I_V$ and $Q_V$ values output by the ADCs 155a-155d and determines a frequency domain representation of the received data. A spectrum separator 540 recovers each of the desired transmission subchannels from the frequency domain representation, and provides each transmission subchannel to a corresponding inverse FFT (IFFT) 550a-550d. Each IFFT 550a-550d converts its corresponding transmission subchannel to the time domain and outputs a data stream $S_1$-$S_4$ corresponding to the data conveyed by the corresponding transmission subchannel.

FIG. 6 illustrates an optical communication system 600 in which an instance of the transmitter subsystem 105 modulates three subchannels $S_1$, $S_2$ and $S_3$ onto a single grid space, and transmits the composite signal with an initial intensity via a first fiber span 610. In a nonlimiting example, $S_1$ is modulated via a relatively high bit-rate protocol that may have a relatively high noise sensitivity, e.g. PDM-64QAM, $S_2$ is modulated via a bit-rate protocol that may have a moderate noise sensitivity, e.g. PDM-16QAM, and $S_3$ is modulated via a relatively low bit-rate protocol that may have a relatively low noise sensitivity, e.g. PDM-QPSK.

A splitter 620 directs a first portion of the transmitted signal to a first instance of the receiver subsystem 115 designated 115a that is configured to demodulate $S_1$. A remaining portion of the transmitted signal propagates with diminished intensity via a second fiber span 630 to a second splitter 640. A second instance of the receiver subsystem 115 designated 115b receives a second portion of the transmitted signal and demodulates $S_2$ therefrom. A remaining portion of the transmitted signal propagates with further diminished intensity via a third fiber span 650 to a third instance of the receiver subsystem 115 designated 115c that is configured to demodulate the subchannel $S_3$.

The span 610 may be a local optical data path, e.g. a few km. The span 630 may be moderately long path, e.g. 100 km. The span 650 may be a long-haul span, e.g. >1000 km. Thus, the single transmitter subsystem 105 is able to provide a transmission signal that meets the needs of three difference spans. In another case a different combination transmission needs may be present. Another instance of the transmitter subsystem 105 may be configured for this case, in some case with only a change to the configuration control signal 420.

FIGS. 7A and 7B provide additional embodiments that illustrate advantageous aspects of the invention. FIG. 7A includes three terminal transceivers 710a, 710b and 710c. The transceiver 710a is coupled to a splitter/coupler 720, e.g. a 3 dB coupler. One output of the splitter/coupler 720 is coupled to the transceiver 710b, and the other output is coupled to the transceiver 710c. A grid spacing of 50 GHz is assumed without limitation. Two subchannels 730 and 740 are shown, both being QPSK modulated at 50 Gb/s. The first subchannel 730 is modulated below $\lambda_0$ (e.g., "bluer") while the second subchannel 740 is modulated above $\lambda_0$ (e.g., "redder".)

The transceiver 710b is configured to transmit and receive data using the subchannel 730. The transceiver 710c is configured to transmit and receive data using the subchannel 740. The transceiver 710a is configured to transmit and receive data using both the subchannels 730 and 740. The configuration provides advantageous aspects, including 1) the configuration increases the granularity of the optical grid, e.g. increases flexibility of using portions of the available grid spacing to transmit separately modulated data; and 2) the illustrated principle may form the basis of an optical add-drop network element. Thus optical add/drop capability may be achieved within a single optical grid.

In the embodiment illustrated by FIG. 7A, the data rate and spectrum usage ratio are both 50 Gb/S for two subchannels. However, the two subchannels may be QPSK modulated at different data rates, e.g. 40 Gb/s and 60 Gb/s, for 40% and 60% spectrum allocation, respectively. Other embodiments may provide other data rates and spectrum usage ratios. This example illustrates without limitation one advantage of some embodiments, e.g. sub-wavelength grooming and network flexibility may be obtained without the use of a burst mode transceiver and fast tunable local oscillator as described by some proposed solutions. (See, e.g., M. Li, et al., "Optical Burst-mode Coherent Receiver with a Fast Tunable LO for Receiving Multi-wavelength Burst Signals," in Optical Fiber Communication Conference, OSA Technical Digest (Optical Society of America, 2012), paper OTu1G.3.) Thus unlike such solutions, embodiments described herein may provide sub-wavelength grooming and network flexibility with a fixed-frequency LO and continuous signal detection. Such embodiments may have lower complexity and cost of the optical and electrical components relative to burst mode operation. For example, components such as a fast tunable LO laser, special detection, scheduling and time guard band needed for burst mode detection are not needed for in the embodiments of FIG. 7A. "Special detection" typically requires, e.g. fast recovery of signal, time scheduling of different channels and packets, and deep memory.

FIG. 7B illustrates a network configured for high data throughput. Two transceivers 750a and 750b are coupled via an optical network and configured as described by various embodiments for flexible channel configuration. The transceivers 750a and 750b are configured to transmit and receive four subchannels 760a-760d. The subchannels 760a-760d are each modulated using 64QAM to provide 100 Gb/s. This configuration provides a high data throughput for the optical network between the transceivers 750a and 750b. Thus the examples of FIGS. 7A and 7B illustrate the flexibility of the architecture provided by the transmitter 105 and the receiver 115 to provide flexible network configurability to meet different network objectives such as high throughput or add/drop capability.

Turning now to FIG. 8, a method 800 is described, e.g. for forming an optical transmission system according to various embodiments. The steps of the method 800 are described without limitation by reference to elements previously described herein, e.g. in FIGS. 1-6. The steps of the method 800 may be performed in another order than the illustrated order, and in some embodiments may be omitted altogether.

In a step 810 an I-Q modulator, e.g. the I-Q modulator 135a, is configured to modulate a first light source, e.g. the light source 140, in response to first I and Q modulation signals. In a step 820 a transmission signal processor, e.g. the transmit DSP 120, is configured to 1) receive a data stream, e.g. the data stream 101, including data corresponding to a first data subchannel, 2) map the data subchannel to an optical transmission subchannel, e.g. the transmission subchannel 230a, and 3) output the first I and Q modulation signals to modulate the light source to produce an optical transmission signal that includes wavelength components corresponding to the optical transmission subchannel.

In some embodiments the I-Q modulator is a first I-Q modulator, and the method 800 includes a step 830 in which a second I-Q modulator, e.g. the I-Q modulator 135b, is configured to modulate a second light source, e.g. the light source 140, in response to second I and Q modulation signals. Such embodiments also include a step 840 in which a polarization multiplexer, e.g. the MUX 142, is configured to receive outputs of the first and second I-Q modulators and output the optical transmission signal with first and second polarization modes. In such embodiments the transmission signal processor is further configured to 1) map a second data subchannel of the data stream to a second optical transmission subchannel, e.g. the subchannel 230b, and 2) output the second I and Q modulation signals to modulate the second light source to produce wavelength components of the optical transmission signal that correspond to the second optical transmission subchannel.

In some embodiments the transmission signal processor is selectively configurable to implement different modulation protocols for the first and second transmission subchannels, e.g. PDM-BPSK and PDM-16QAM. In some embodiments a single laser provides both of the first and second light sources. In some embodiments the first data subchannel is mapped to a horizontal polarization of the optical transmission signal, and the second data subchannel is mapped to a vertical polarization of the optical transmission signal.

In some embodiments of the method 800 the method includes a step 850 in which an optical receiver, e.g. the receiver 115, is configured to recover data corresponding to the first data subchannel from the optical transmission subchannel. In some such embodiments the optical receiver is configured to recover data from fewer than all optical transmission subchannels present on the optical transmission signal. In some embodiments the optical receiver includes an optical hybrid, e.g. the optical hybrid 145, configured to recover I and Q signals for each of the first and second polarization modes. In some embodiments a first optical receiver is configured to recover the first data subchannel from the optical transmission signal, and a second optical receiver is configured to recover the second data subchannel from the optical transmission signal.

Those skilled in the art to which this application relates will appreciate that other and further additions, deletions, substitutions and modifications may be made to the described embodiments.

What is claimed is:

1. A system comprising:
   a first I-Q modulator configured to modulate a first light source in response to first I and Q modulation signals;
   a second I-Q modulator configured to modulate a second light source in response to second I and Q modulation signals;
   a transmission signal processor configured to:
      receive a data stream including data corresponding to a first data subchannel;
      map said first data subchannel to a first optical transmission subchannel; and
      output said first I and Q modulation signals to modulate said first light source to produce an optical transmission signal that includes wavelength components corresponding to said first optical transmission subchannel; and
   a polarization multiplexer configured to receive outputs of said first and second I-Q modulators and output said optical transmission signal with first and second polarization modes.

2. The system of claim 1
   wherein said transmission signal processor is further configured to:
      map a second data subchannel of said data stream to a second optical transmission subchannel; and
      output said second I and Q modulation signals to modulate said second light source to produce wavelength components of said optical transmission signal that correspond to said second optical transmission subchannel.

3. The system of claim 2, wherein said transmission signal processor is selectively configurable to implement different modulation protocols for said first and second transmission subchannels.

4. The system of claim 2, wherein a single laser provides both of said first and second light sources.

5. The system of claim 4, wherein said laser is a fixed-frequency optical source.

6. The system of claim 2, wherein said first data subchannel is mapped to a horizontal polarization of said optical transmission signal, and said second data subchannel is mapped to a vertical polarization of said optical transmission signal.

7. The system of claim 2, further comprising an optical receiver including an optical hybrid configured to recover I and Q signals for each of said first and second polarization modes.

8. The system of claim 2, further comprising a first optical receiver configured to recover said first data subchannel from said optical transmission signal, and a second optical receiver configured to recover said second data subchannel from said optical transmission signal.

9. The system of claim 1, further comprising an optical receiver configured to recover data corresponding to said first data subchannel from said first optical transmission subchannel.

10. The system of claim 9, wherein said optical receiver is configured to recover data from fewer than all optical transmission subchannels present on said optical transmission signal.

11. The system of claim 1, further comprising digital to analog converters configured to convert said first I and Q modulation signals to analog signals output to said first I-Q modulator.

12. A method comprising:
configuring a first I-Q modulator to modulate a first light source in response to first I and Q modulation signals and a second I-Q modulator to modulate a second light source in response to second I and Q modulation signals; and
configuring a transmission signal processor to:
receive a data stream including data corresponding to first and second data subchannels;
map said first and second data subchannels to first and second optical transmission subchannels; and
output said first and second I and Q modulation signals to modulate said first and second light sources to produce an optical transmission signal that includes wavelength components corresponding to said first and second optical transmission subchannels.

13. The method of claim 12 further comprising:
configuring a polarization multiplexer to receive outputs of said first and second I-Q modulators and output said optical transmission signal with first and second polarization modes.

14. The method of claim 13, wherein said transmission signal processor is selectively configurable to implement different modulation protocols for said first and second transmission subchannels.

15. The method of claim 13, wherein a single laser provides both of said first and second light sources.

16. The method of claim 13, wherein said first data subchannel is mapped to a horizontal polarization of said optical transmission signal, and said second data subchannel is mapped to a vertical polarization of said optical transmission signal.

17. The method of claim 13, further comprising configuring an optical receiver including an optical hybrid to recover I and Q signals for each of said first and second polarization modes.

18. The method of claim 13, further comprising configuring a first optical receiver to recover said first data subchannel from said optical transmission signal, and configuring a second optical receiver to recover said second data subchannel from said optical transmission signal.

19. The method of claim 12, further comprising configuring an optical receiver to recover data corresponding to said first data subchannel from said first optical transmission subchannel.

20. The method of claim 19, wherein said optical receiver is configured to recover data from fewer than all optical transmission subchannels present on said optical transmission signal.

21. The method of claim 12, further comprising configuring digital to analog converters to convert said first I and Q modulation signals to analog signals output to said first I-Q modulator.

* * * * *